(12) United States Patent
Park

(10) Patent No.: US 11,312,356 B2
(45) Date of Patent: Apr. 26, 2022

(54) HYBRID VEHICLE AND DRIVING CONTROL METHOD THEREFOR

(71) Applicants: HYUNDAI MOTOR COMPANY, Seoul (KR); KIA MOTORS CORPORATION, Seoul (KR)

(72) Inventor: Joon Young Park, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 295 days.

(21) Appl. No.: 16/518,605

(22) Filed: Jul. 22, 2019

(65) Prior Publication Data

US 2020/0139955 A1 May 7, 2020

(30) Foreign Application Priority Data

Nov. 1, 2018 (KR) .................. 10-2018-0132810

(51) Int. Cl.
*B60W 20/10* (2016.01)
*B60W 10/06* (2006.01)
*B60W 10/08* (2006.01)
*B60W 10/18* (2012.01)
*B60W 30/18* (2012.01)

(Continued)

(52) U.S. Cl.
CPC ............ *B60W 20/10* (2013.01); *B60W 10/06* (2013.01); *B60W 10/08* (2013.01); *B60W 10/18* (2013.01); *B60W 30/18* (2013.01); *B60K 6/22* (2013.01); *B60K 6/48* (2013.01); *B60W 2540/10* (2013.01); *B60W 2540/12* (2013.01); *B60W 2710/0616* (2013.01); *B60W 2710/083* (2013.01); *B60W 2710/18* (2013.01); *B60W 2720/106* (2013.01); *B60Y 2200/92* (2013.01)

(58) Field of Classification Search
CPC ...... B60W 20/10; B60W 10/06; B60W 10/08; B60W 10/18; B60W 30/18; B60W 2540/10; B60W 2710/0616; B60W 2710/18; B60W 2710/083; B60W 2720/106; B60W 2540/12; B60W 2710/0666; B60W 2510/244; B60W 20/19; B60W 20/14; B60W 30/18127; B60W 50/10; B60W 10/26; B60W 2510/0657; B60W 2510/083; B60W 2520/10; B60Y 2200/92; B60Y 2300/18125; B60Y 2400/81; B60K 6/22; B60K 6/48; B60K 2006/4825; B60K 6/46; Y02T 10/62; B60T 2270/60
See application file for complete search history.

(56) References Cited

U.S. PATENT DOCUMENTS 11,161,510 B2* 11/2021 Doering ................ B60W 20/19
2011/0295468 A1* 12/2011 Crombez ................ B60T 7/042
701/48

(Continued)

*Primary Examiner* — Brian P Sweeney
(74) *Attorney, Agent, or Firm* — Morgan, Lewis & Bockius LLP

(57) ABSTRACT

A driving control method for a hybrid vehicle including an electric motor and an engine includes, when an acceleration request via manipulation of an accelerating pedal and a deceleration request via manipulation of a brake pedal are simultaneously made in a situation in which a predetermined condition is satisfied, implementing the acceleration request as torque of the engine, and implementing the deceleration request as regenerative brake torque of the electric motor.

7 Claims, 12 Drawing Sheets

(51) Int. Cl.
  *B60K 6/22*       (2007.10)
  *B60K 6/48*       (2007.10)

(56) References Cited

U.S. PATENT DOCUMENTS

2013/0151053 A1* 6/2013 Hashimoto ........... B60W 20/50
                                                701/22
2014/0330472 A1* 11/2014 Hashimoto ......... B60W 10/184
                                                701/22

* cited by examiner

HYBRID VEHICLE AND DRIVING CONTROL METHOD THEREFOR

This application claims the benefit of priority to Korean Patent Application No. 10-2018-0132810, filed on Nov. 1, 2018 in the Korean Intellectual Property Office, which is hereby incorporated by reference.

TECHNICAL FIELD

The present disclosure relates to a hybrid vehicle and a driving control method therefor, and more particularly, to a high-performance hybrid vehicle with excellent re-acceleration response and a driving control method therefor.

BACKGROUND

In general, a hybrid electric vehicle (HEV) refers to a vehicle that uses two power sources that mainly include an engine and an electric motor. An HEV has excellent fuel efficiency and engine performance compared with a vehicle including only an internal combustion engine and is also advantageous for lowering emissions and, thus, has been actively developed recently.

Such a hybrid vehicle travels in two modes according to a powertrain used to drive the vehicle. One of the modes is an electric vehicle (EV) mode in which the vehicle travels using only an electric motor and the other mode is a hybrid electric vehicle (HEV) mode of operating both an electric motor and an engine to acquire power. A hybrid vehicle switches between the two modes according to driving conditions.

Such switch between driving modes is generally performed to maximize fuel consumption or driving efficiency depending on the efficiency characteristics of a powertrain, but hybrid vehicles that are developed in terms of efficiency have been recently developed in terms of driving performance for enabling sports driving.

For rapid re-acceleration after deceleration in the case of cornering among sports driving skills, an accelerating pedal and a brake pedal are simultaneously manipulated during deceleration, a so-called "heel and toe" scheme is used. This is technology that is mainly embodied for high-performance manual transmission (MT) vehicle and the term "heel and toe" is named because an accelerating pedal is manipulated with the heel while a brake pedal is manipulated with a toe side of one foot. Needless to say, among drivers of a vehicle without a clutch pedal, some drivers manipulate an accelerating pedal and a brake pedal with right and left feet, respectively rather than simultaneously manipulating the two pedals with one foot, and thus, in this case, "left foot braking" is used instead of "heel and toe".

Needless to say, a general vehicle that has been recently introduced implements a "brake override" (or "smart pedal") function of limiting engine torque for preventing accidents due to a mal-operation when a brake pedal and an accelerating pedal are simultaneously manipulated, but some vehicles that are of importance to sports characteristics turn on a brake override function to enable the heel and toe under a specific condition (e.g., when electronic type attitude control such as ECS/VDC is turned off in a sports mode).

Hereinafter, a difference between a general re-acceleration case after deceleration and a re-acceleration case after deceleration using the heel and toe scheme will be described with reference to FIGS. 1 and 2.

FIG. 1 illustrates pedal manipulation and traction force application in the general re-acceleration case after deceleration. FIG. 2 illustrates pedal manipulation and traction force application in the re-acceleration case after deceleration using a heel and toe scheme. FIGS. 1 and 2 commonly assume a situation in which a vehicle re-accelerates at a time point of escaping from a corner after the vehicle decelerates before cornering.

First, referring to FIG. 1, the accelerating pedal is manipulated prior to entrance into a corner and, then, the accelerating pedal is released and, simultaneously, the brake pedal is manipulated before entrance into the corner. When a vehicle sufficiently decelerates and, then, escapes from a corner, the brake pedal is re-released and the accelerating pedal is manipulated to re-accelerate the vehicle. In this case, a driver takes their foot off the brake pedal and, then, moves their foot to the accelerating pedal for re-acceleration and, thus, brake release delay occurs, and manipulation of the accelerating pedal is released during deceleration and, accordingly, an engine already becomes in a state in which revolution per minute (RPM) is lowered when the vehicle begins to re-accelerate. Accordingly, despite re-acceleration, because a predetermined time is required to increase RPM for the reason such as intake delay, torque output is delayed due to general engine characteristics whereby high torque is achieved in a high-revolving region, and accordingly, re-acceleration is delayed.

On the other hand, as shown in FIG. 2, when the brake pedal is additionally manipulated at a time point of entrance into a corner in a state in which manipulation of an accelerating pedal is maintained, a vehicle decelerates due to brake force of a brake, but an engine may be maintained in a high-revolving state (i.e., high torque and high output). Accordingly, there is no problem such as torque delay due to intake delay at a time point of escaping from a corner.

However, the heel and toe scheme also has disadvantages, which will be described with reference to FIG. 3. FIG. 3 is a diagram for explanation of a problem of the heel and toe scheme.

Referring to FIG. 3, entire engine force is discarded in the form of frictional heat by a degree by which engine force and brake force of a brake overlap each other. Accordingly, as the brake is increasingly used, engine traction force is wasted. For deceleration as well as in terms of efficiency, the brake needs to generate brake force equal to or greater than engine force, and thus, a burden to a brake system is increased. Accordingly, when such deceleration is repeatedly used, a fading or vapor lock phenomenon of the brake occurs and, thus, brake performance is drastically degraded.

Accordingly, there is a need for a method of enhancing efficiency and protecting a brake system when a high-performance hybrid vehicle decelerates while maintaining engine force.

SUMMARY

Accordingly, the present disclosure is directed to a hybrid vehicle and a driving control method therefor that substantially obviates one or more problems due to limitations and disadvantages of the related art.

An object of the present disclosure is to provide a driving control method and a hybrid vehicle therefor, for enhancing efficiency and protecting a brake system when the vehicle decelerates while maintaining engine force.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the present disclosure, as embodied and broadly described herein, a driving control method for a hybrid vehicle including an electric motor and an engine includes, when an acceleration request via manipulation of an accelerating pedal and a deceleration request via manipulation of a brake pedal are simultaneously made in a situation in which a predetermined condition is satisfied, implementing the acceleration request as torque of the engine, and implementing the deceleration request as regenerative brake torque of the electric motor.

In another aspect of the present disclosure, a driving control method for a hybrid vehicle including an engine, a motor, and a battery includes determining acceleration force requirement based on manipulation of an accelerating pedal, and determining an engine target torque and a first target torque of the motor, for satisfying the acceleration force requirement, based on a driving state including states of the engine, the motor, and the battery, and a vehicle speed, determining brake force requirement based on manipulation of a brake pedal, and determining a target hydraulic pressure of a hydraulic brake and second target torque of the motor, for satisfying the brake force requirement, based on states of a hydraulic brake system, the battery, and the motor, and determining a third target torque for implementing the brake force requirement by the motor in a state in which the engine maintains the engine target torque when the accelerating pedal and the brake pedal are simultaneously manipulated under a predetermined condition.

In another aspect of the present disclosure, a hybrid vehicle includes a motor, an engine, and a hybrid controller configured, when an acceleration request via manipulation of an accelerating pedal and a deceleration request via manipulation of a brake pedal are simultaneously made in a situation in which a predetermined condition is satisfied, to implement the acceleration request as torque of the engine and to implement the deceleration request as regenerative brake torque of the electric motor.

In another aspect of the present disclosure, a hybrid vehicle, including an engine, a motor, and a battery, includes a processor including an acceleration operating point determination module configured to determine acceleration force requirement based on manipulation of an accelerating pedal and to determine an engine target torque and a first target torque of the motor, for satisfying the acceleration force requirement, based on a driving state including states of the engine, the motor, and the battery, and a vehicle speed, a brake force determination module configured to determine brake force requirement based on manipulation of a brake pedal and to determine a target hydraulic pressure of a hydraulic brake and a second target torque of the motor, for satisfying the brake force requirement, based on states of a hydraulic brake system, the battery, and the motor, and a sports operating point determining module configured to determine a third target torque for implementing the brake force requirement by the motor in a state in which the engine maintains the engine target torque when the accelerating pedal and the brake pedal are simultaneously manipulated under a predetermined condition.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Figure 1:
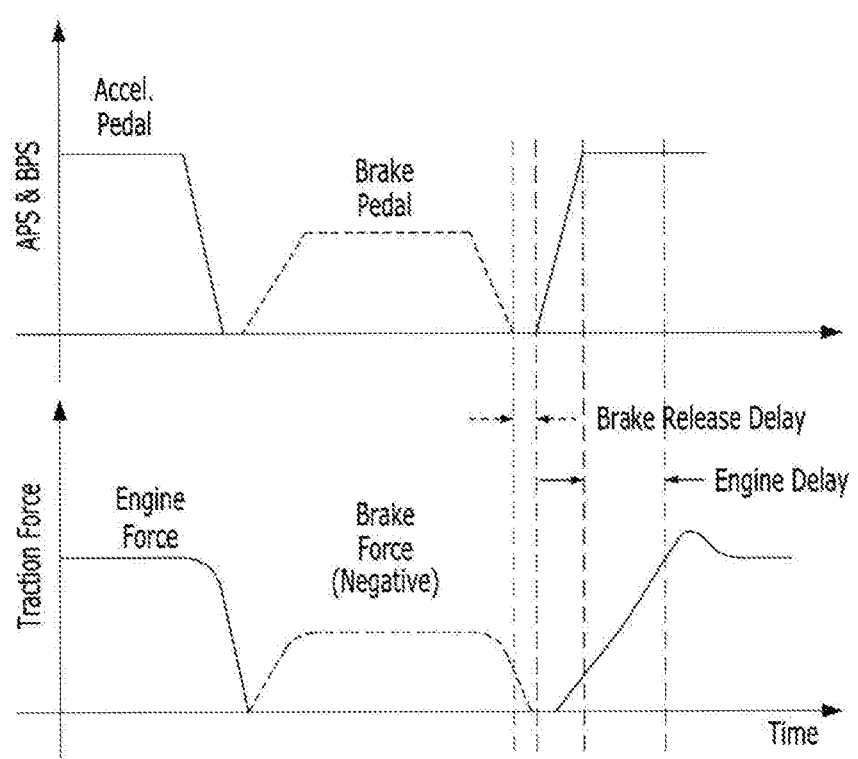
FIG. 1 illustrates pedal manipulation and traction force application in a general re-acceleration case after deceleration and FIG. 2 illustrates pedal manipulation and traction force application in a re-acceleration case after deceleration using a heel and toe scheme.
Figure 2:
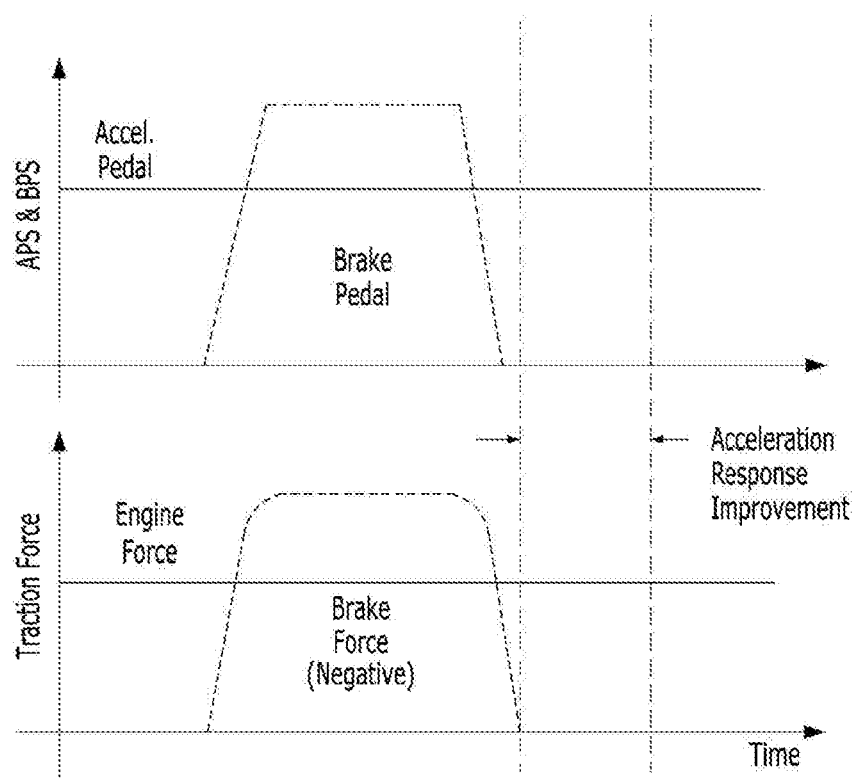
Figure 3:
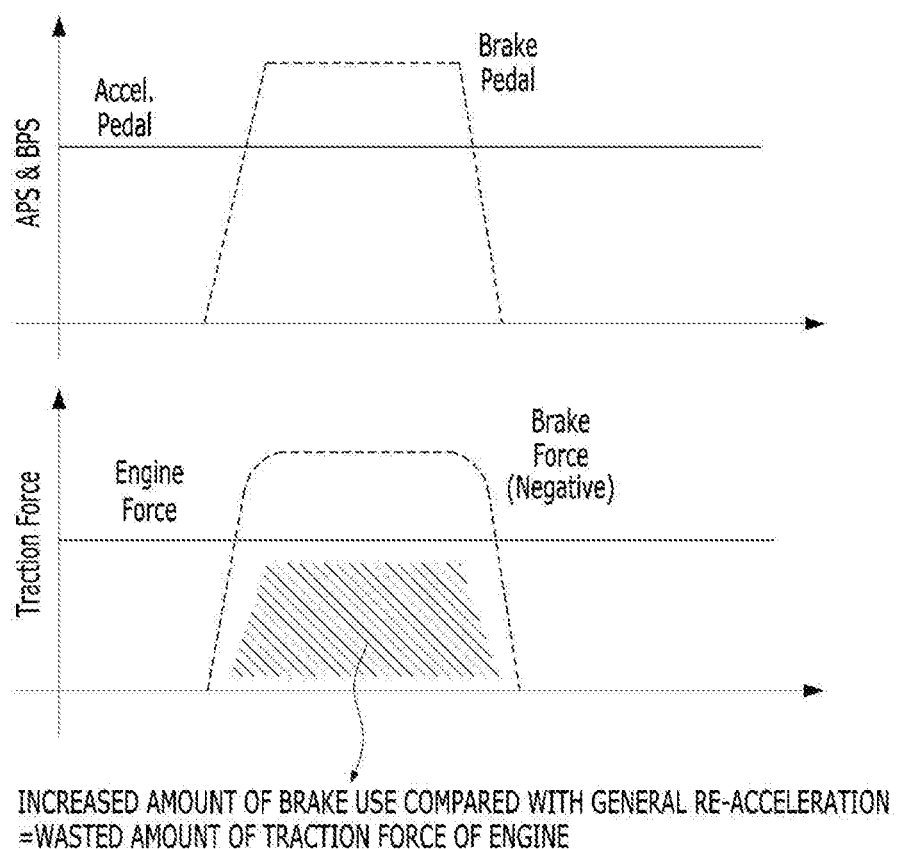
FIG. 3 is a diagram for explanation of a problem of a heel and toe scheme.

Exemplary embodiments of the present disclosure are described in detail so as for those of ordinary skill in the art to easily implement with reference to the accompanying drawings. However, the present disclosure may be implemented in various different forms and is not limited to these embodiments. To clearly describe the present disclosure, a part without concerning to the description is omitted in the drawings, and like reference numerals in the specification denote like elements.

In addition, when a certain part "includes" a certain component, this indicates that the part may further include another component instead of excluding another component unless there is no different disclosure. The same reference numbers will be used throughout the drawings and the specification to refer to the same parts.

According to exemplary embodiments of the present disclosure, in the case of deceleration by manipulating both an accelerating pedal and a brake pedal, a brake method may be differentiated in that, for example, at least a portion of brake force may be embodied via regenerative brake depending on a vehicle situation and, thus, efficiency may be enhanced and a brake system may be protected.

Hereinafter, a deceleration method of simultaneously manipulating an accelerating pedal and a brake pedal for rapid re-acceleration under a predetermined condition, a so-called "heel and toe" scheme or "left foot baking" scheme will be referred to as "sports deceleration".

Prior to a description of a driving control method according to an exemplary embodiment of the present disclosure, the configuration and control system of a hybrid vehicle, which are applicable to exemplary embodiments of the present disclosure, will be described.

Figure 4:
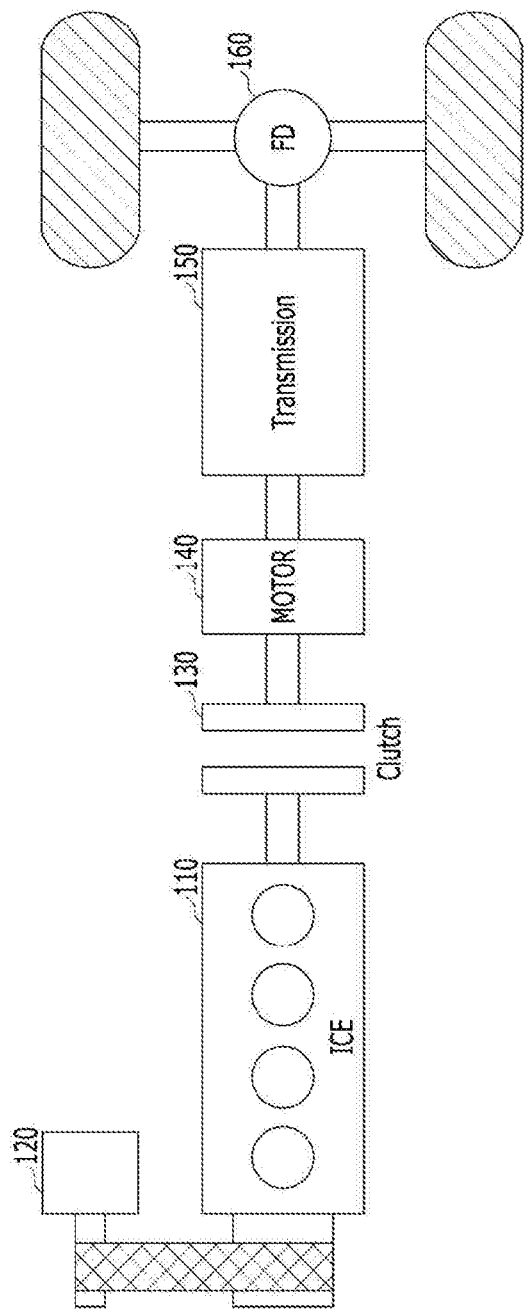
FIG. 4 is a diagram illustrating an example of a powertrain structure of a hybrid vehicle according to exemplary embodiments of the present disclosure.

First, a hybrid vehicle according to exemplary embodiments of the present disclosure will be described with reference to FIG. 4. FIG. 4 is a diagram illustrating an example of a powertrain structure of a hybrid vehicle according to exemplary embodiments of the present disclosure.

Referring to FIG. 4, the drawing illustrates a powertrain of a hybrid vehicle employing a parallel type hybrid system including an electric motor 140 (or a driving motor) and an engine clutch 130 that are installed between an internal combustion engine (ICE) 110 and a transmission 150.

In such a vehicle, in general, when a driver presses an accelerator after turning on the vehicle, the motor 140 is driven using power of a battery while the engine clutch 130 is open and transmits power to move wheels through the transmission 150 and a final drive (FD) 160 (i.e., EV mode). As the vehicle gradually accelerates, high traction force is further required and, in this case, an auxiliary motor (or a starter generator motor 120) may be operated to drive the engine 110.

Accordingly, when rotational speeds of the engine 110 and the motor 140 are equal to each other, the engine clutch 130 is then engaged such that both the engine 110 and the motor 140 drive the vehicle (i.e., transition to an HEV mode from an EV mode). When a predetermined engine off condition such as vehicle deceleration is satisfied, the engine clutch 130 is open and the engine 110 stops (i.e., transition to an EV mode from an HEV mode). In addition, the hybrid vehicle converts traction force of a wheel into electric energy to recharge a battery, which is referred to as braking energy regeneration or regenerative braking.

The starter generator motor 120 functions as a starter motor when the engine is turned on and functions as a generator after the engine is turned on or when rotational energy is recovered during engine off and, thus, the starter generator motor 120 may also be referred to as a hybrid starter generator (HSG) and, as necessary, may be referred to as an auxiliary motor.

Figure 5:
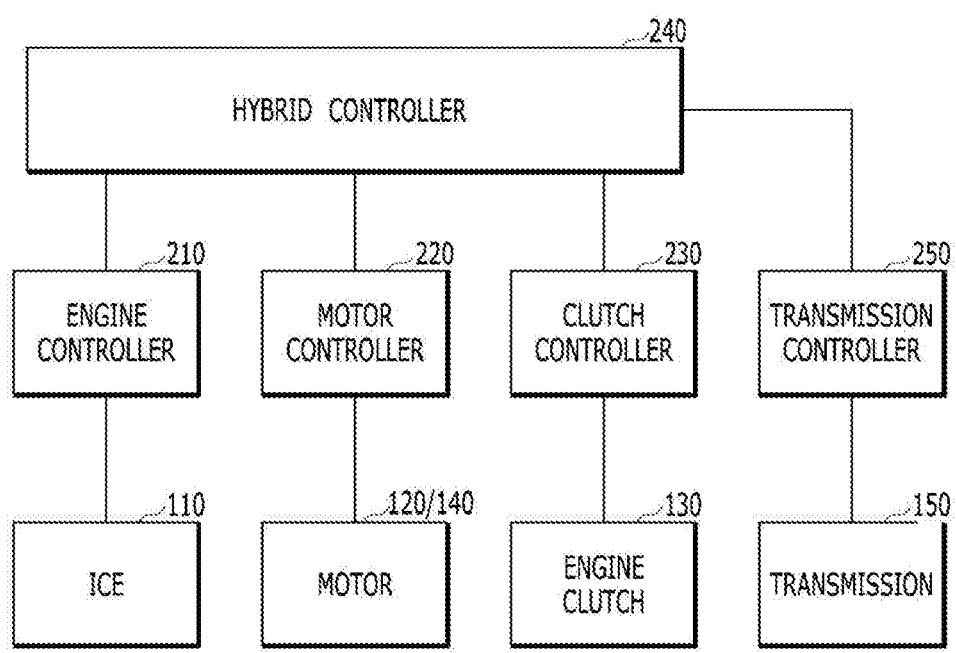
FIG. 5 is a block diagram showing an example of a control system of a hybrid vehicle according to exemplary embodiments of the present disclosure.

A relationship among controllers of a vehicle including the aforementioned powertrain is shown in FIG. 5.

FIG. 5 is a block diagram showing an example of a control system of a hybrid vehicle according to exemplary embodiments of the present disclosure.

Referring to FIG. 5, in the hybrid vehicle according to exemplary embodiments of the present disclosure, the internal combustion engine 110 may be controlled by an engine controller 210, torque of the starter generator motor 120 and the motor 140 may be controlled by a motor controller 220, and the engine clutch 130 may be controlled by a clutch controller 230. Here, the engine controller 210 may also be referred to as an engine management system (EMS). In addition, the transmission 150 may be controlled by a transmission controller 250. As necessary, the starter generator motor 120 and the motor 140 may be controlled by different separate motor controllers.

Each controller may be connected to a hybrid controller 240 for controlling an overall mode switching procedure as a high-level controller and may provide information required to switch driving modes and to control an engine clutch during gear shift, and/or information required to control engine off or may perform an operation according to a control signal under control of a hybrid controller 240.

The hybrid controller 240 according to an exemplary embodiment of the present disclosure may be a processor (e.g., computer, microprocessor, CPU, ASIC, circuitry, etc.).

The hybrid controller 240 may be implemented through a non-transitory memory configured to store data with respect to algorithms configured to control operations of various components in the vehicle or software instructions reproducing the algorithms, and a processor configured to perform the operations described hereinafter by using the data stored in the memory. Herein, the memory and the processor may be implemented as separate semiconductor circuits. Alternatively, the memory and the processor may be implemented as a single integrated semiconductor circuit. The processor may embody one or more processor(s).

In more detail, the hybrid controller 240 may determine whether modes are switched depending on a driving state of a vehicle. For example, the hybrid controller may determine an open time of the engine clutch (EC) 130 and may control hydraulic pressure (in the case of a wet EC) or control torque capacity (in the case of a dry EC) when the EC is open. The hybrid controller 240 may determine an EC state (lock-up, slip, open, etc.) and may control a time for stop of fuel injection of the engine 110. The hybrid controller may transmit a torque command for controlling torque of the starter generator motor 120 to the motor controller 220 to control engine off and may control engine rotational energy recovery. In addition, the hybrid controller 240 may determine a mode switching condition during control of driving mode switching and may control a low-level controller for mode switching.

Needless to say, it would be obvious to one of ordinary skill in the art that the aforementioned relationship between the controllers and functions/divisions of the controllers are exemplary and, thus, are not limited to the terms. For example, the hybrid controller 240 may be embodied by allowing any one of other controllers except for the hybrid controller 240 to provide a corresponding function or two or more of other controllers may distribute and provide the corresponding function.

The aforementioned configurations of FIGS. 4 and 5 are merely an example of the configuration of a hybrid vehicle, and it would be obvious to one of ordinary in the art that the hybrid vehicle applicable to embodiments is also applied to a series type or series/parallel type powertrain structure without being limited to this configuration.

Figure 6:
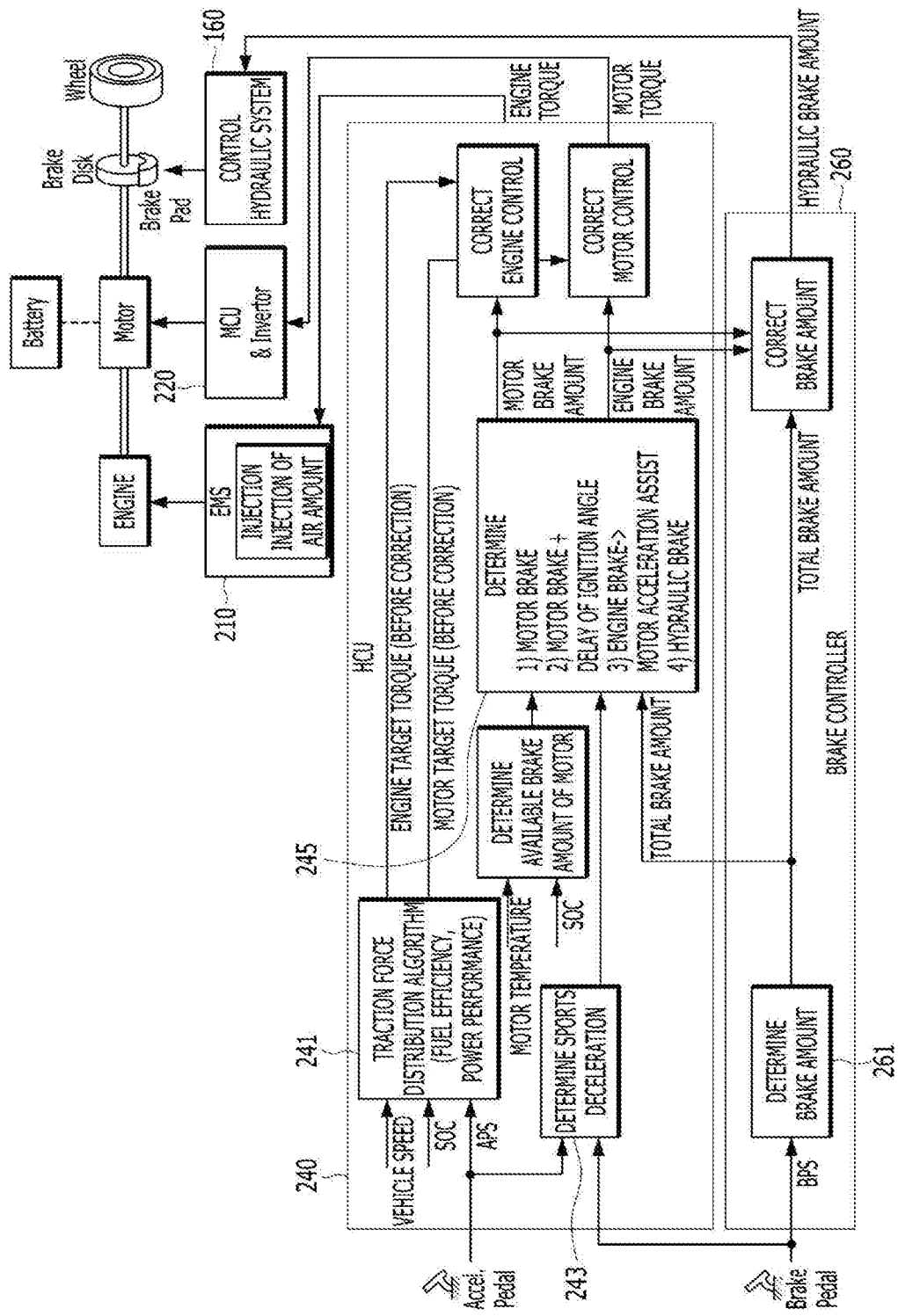
FIG. 6 is a diagram showing an example of the configuration of a hybrid vehicle for performing driving control according to an exemplary embodiment of the present disclosure.
Figure 7:
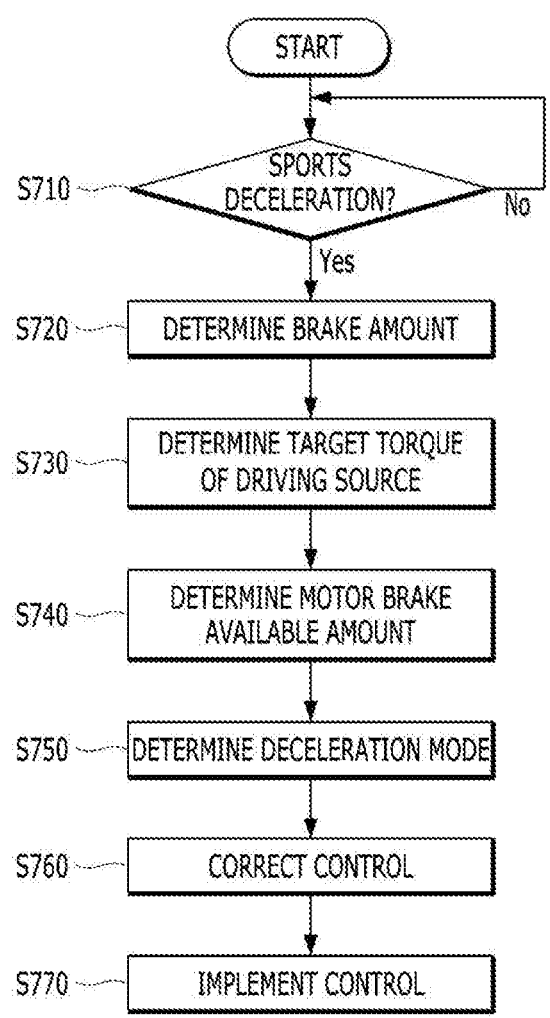
FIG. 7 is a flowchart showing an example of a driving control procedure according to an exemplary embodiment of the present disclosure.

Hereinafter, a driving control procedure according to an exemplary embodiment of the present disclosure will be described with reference to FIGS. 6 and 7. FIG. 6 is a diagram showing an example of the configuration of a hybrid vehicle for performing driving control according to an exemplary embodiment of the present disclosure. FIG. 7 is a flowchart showing an example of a driving control procedure according to an exemplary embodiment of the present disclosure.

First, referring to FIG. 6, a hybrid controller 240 according to an exemplary embodiment of the present disclosure may include a processor. The processor has an associated non-transitory memory storing software instructions which, when executed by the processor, provides the functionalities of an acceleration driving point determination module 241, a sports deceleration determination module 243, and a sports deceleration operating point determination module 245. The processor of the hybrid controller 240 may take the form of one or more processor(s) and associated memory storing program instructions.

Here, the acceleration driving point determination module 241 may determine acceleration force requirement based on an accelerating pedal (Accel. Pedal) value (APS), and may determine engine target torque (i.e., engine target torque before correction) and motor target torque (i.e., motor target torque before correction), for satisfying the acceleration force requirement, based on a driving state including states of an engine, a motor, and a battery, and a vehicle speed.

The sports deceleration determination module 243 may determine whether a brake override function is released (e.g., VDC/ECS/ESP off, selection of a sports mode, or whether a dedicated manipulating apparatus for sports deceleration activation is manipulated), and when the brake override function is released, if the Accel. Pedal value (APS) is greater than a first reference value that is preset for APS (i.e., APS>Th1), and a brake pedal value (BPS) is greater than a second reference value that is preset for BPS (i.e., BPS>Th2), the sports deceleration determination module 243 may determine a corresponding situation to be a sports deceleration situation.

The sports deceleration operating point determination module 245 may determine a deceleration mode about a degree by which an element is applied among an electric motor, an engine, and hydraulic brake in order to implement brake force requirement that is calculated based on the BPS by a brake controller 260 that is described below, in a state in which the engine maintains the engine target torque determined by the acceleration driving point determination module 241. A detailed method of determining a deceleration mode will be described below with reference to FIGS. 9 to 10C. For example, when determining that at least a portion of brake force requirement is implemented using the electric motor, the sports deceleration operating point determination module 245 may determine motor target torque to be output by the motor. In this case, the motor target torque may be different form the motor target torque determined by the acceleration driving point determination module 241.

The brake controller 260 according to an exemplary embodiment may include a processor. The processor has an associated non-transitory memory storing software instructions which, when executed by the processor, provides the functionalities of a brake force determination module 261. The brake force determination module 261 may determine brake force requirement based on the brake pedal value (BPS) and may determine target hydraulic pressure of a hydraulic brake and motor target torque of a motor, for satisfying the brake force requirement, based on states of a brake hydraulic system 160, a battery, and a motor. Here, the motor target torque may also be different from the motor target torque that is determined by the acceleration driving point determination module 241 or the sports deceleration operating point determination module 245.

Hereinafter, a control procedure will be described based on the configuration of FIG. 6 with reference to FIG. 7.

Referring to FIG. 7, whether sports deceleration is performed may be determined (S710). Determination of whether sports deceleration is performed has been described above with regard to the sports deceleration determination module 243, and thus, a repeated description thereof will be omitted.

When sports deceleration is determined to be performed, the brake force determination module 261 of the brake controller 260 may determine total brake force requirement based on the brake pedal value (BPS) (S720).

When determining that sports deceleration is determined, the acceleration driving point determination module 241 of the hybrid controller 240 may calculate driving request torque based on APS input of a driver, a state of charge (SOC) of a battery, and a vehicle speed, and target torque of each driving source (i.e., an engine and a motor) for implementing the calculated driving request torque (S730). In this case, the acceleration driving point determination module 241 may determine target torque of each driving source using an optimum algorithm that is preset for achieving the purpose of enhancing power performance, fuel efficiency, and sense of driving, lowering exhaust gas, and maintaining a state of charge (SOC) of a battery.

Figure 8:
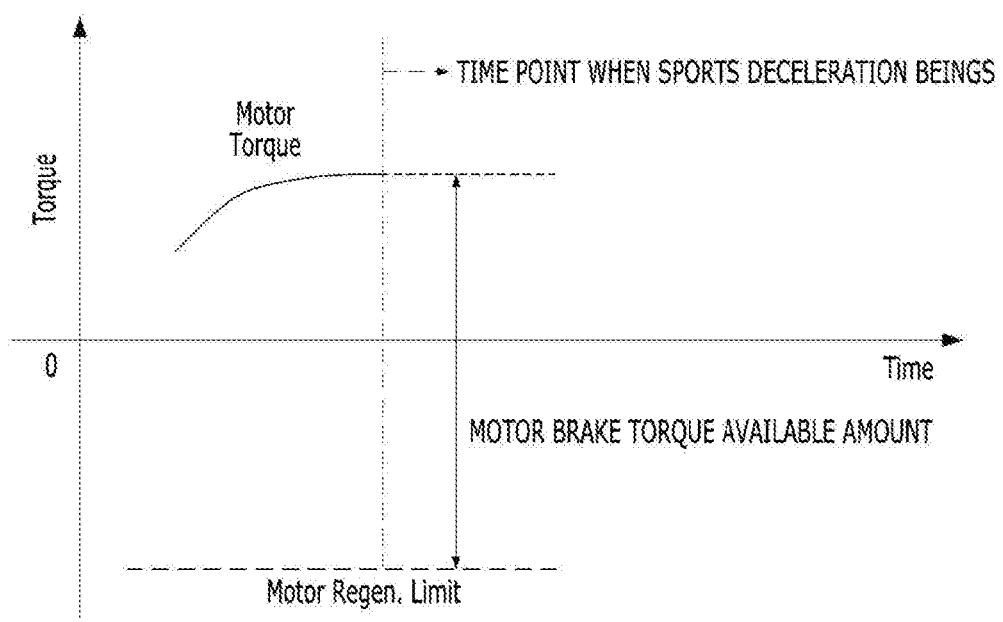
FIG. 8 is a diagram for explanation of a concept of a motor brake available amount according to an exemplary embodiment of the present disclosure.

The hybrid controller 240 may a motor brake (torque implementation) available amount (S740), which will be described with reference to FIG. 8. FIG. 8 is a diagram for explanation of a concept of a motor brake available amount according to an exemplary embodiment of the present disclosure. Referring to FIG. 8, in the case of sports driving, an electric motor may be being operated in a torque assist mode for assisting engine force to output positive torque. When sports deceleration begins in this situation, a power electronics (PE) system such as a motor or an inverter may be protected based on motor output torque at a beginning time point and a motor brake available amount (or an available amount) may be determined based on a battery charge available amount. For example, when a state of charge (SOC) of a battery corresponds to a highest value, it is not possible to additionally charge a battery, and thus, torque up to 0 may be implemented.

Referring back to FIG. 7, the sports deceleration operating point determination module 245 of the hybrid controller 240 may determine a deceleration mode based on the motor brake available amount and a total brake amount (S750). The deceleration mode may include a first mode in which a total brake amount is borne by a motor, a second mode in which both motor brake and rapid reduction of engine torque (e.g., delay of an ignition angle) are used, a third mode in which acceleration is assisted by a motor during re-acceleration after torque reduction of the engine (e.g., reduction in intake/fuel level or injection off), and a fourth mode in which the total brake amount is borne by hydraulic brake. A selection condition of each mode and a detailed form of torque control will be described below with reference to FIGS. 9 to 10C. In this case, determination of a deceleration mode may be a concept of determination of target torque of each of an engine and a motor in the determined deceleration mode.

When the deceleration mode is determined, each of the hybrid controller 240 and the brake controller 260 may correct a control value (S760). In detail, the hybrid controller 240 may apply a correction value of the target torque depending on the deceleration mode to initial target torque that is predetermined by the acceleration driving point determination module 241 with respect to each of the engine and the motor and, thus, may calculate a last control requirement amount. In addition, the brake controller 260 may correct brake force to embody, as hydraulic brake, an insufficient amount of a brake amount, which is obtained by subtracting an implementation amount of brake force by a motor and/or an engine depending on a deceleration mode, from the total request brake amount. In this case, the brake controller 260 may also prepare for a situation such as increase in brake force or change in a limit value during control to embody a predetermined margin in the form of hydraulic brake.

When the control value is completely corrected, a hybrid controller may transmit torque commands to an engine controller 210 and a motor controller 220, respectively depending on a lastly determined operating point of a driving source, and the brake controller 260 may transmit a brake control to the brake hydraulic system 160. Accordingly, an engine, a motor, and a brake may each perform control implementation (S770).

Hereinafter, a deceleration mode determination condition and control form will be described with reference to FIGS. 9 to 10C.

Figure 9:
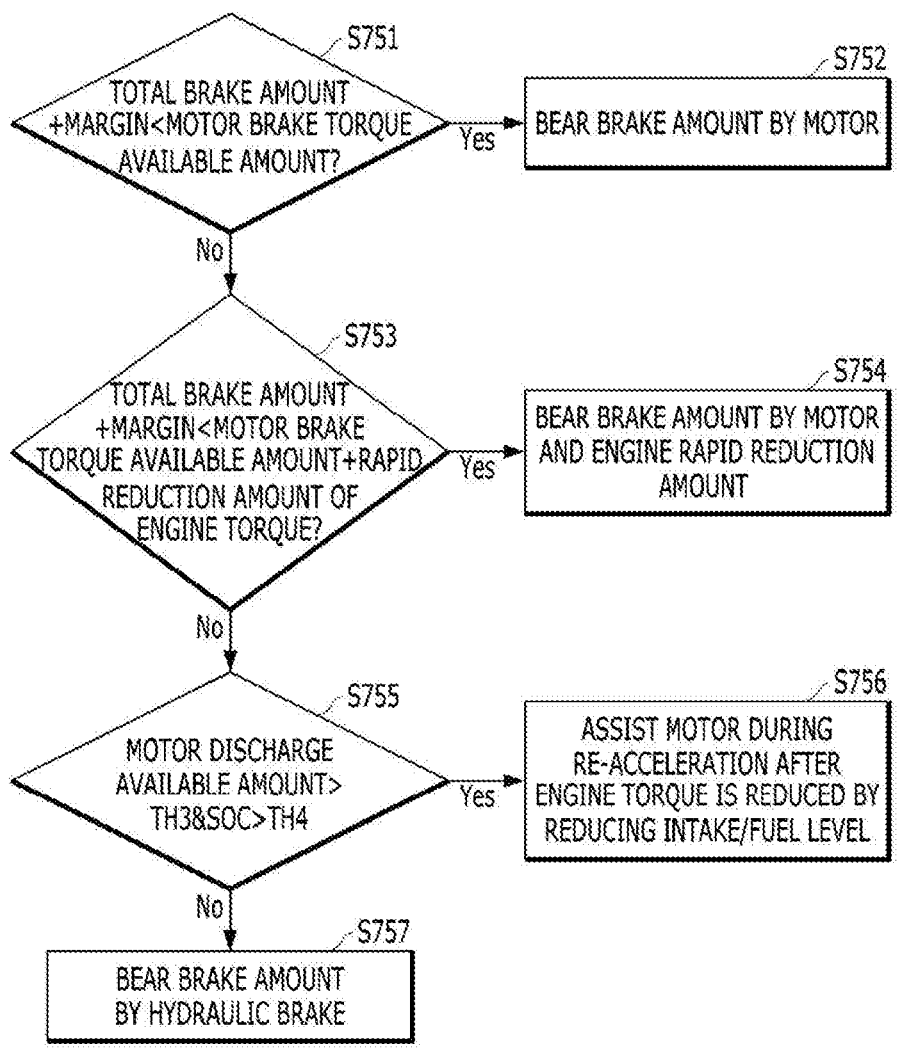
FIG. 9 is a flowchart showing an example of a procedure of determining a deceleration mode according to an exemplary embodiment of the present disclosure.
Figure 10A:
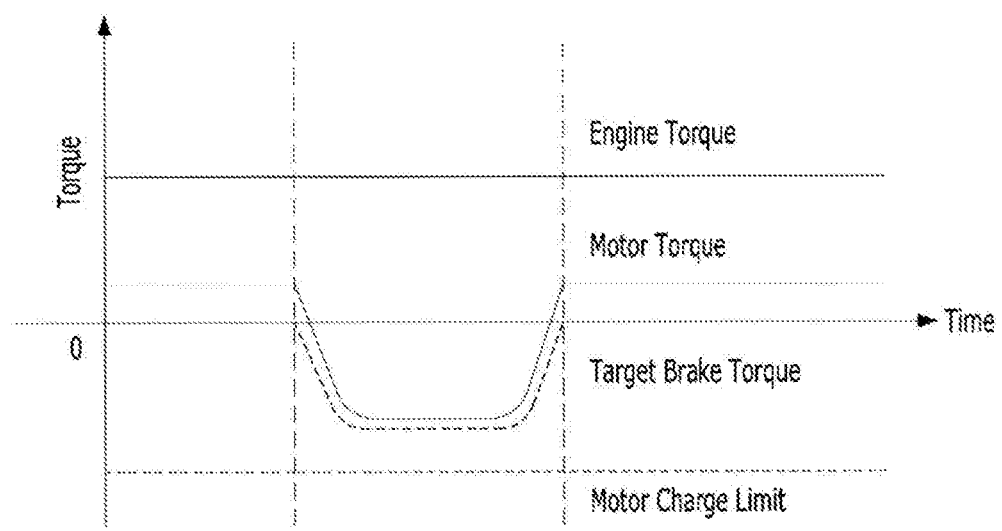
FIGS. 10A to 10C show torque control forms of a deceleration mode according to an exemplary embodiment of the present disclosure.
Figure 10B:
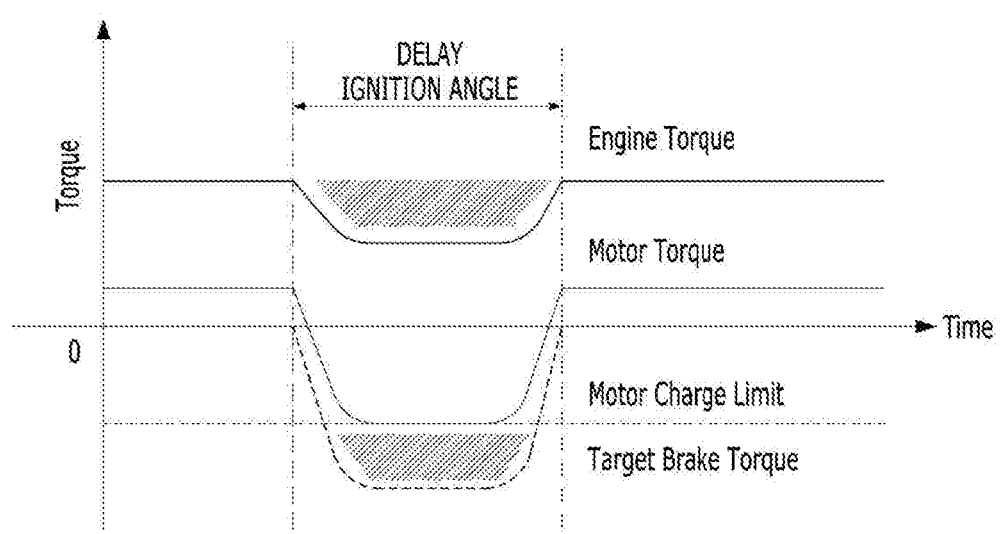
Figure 10C:
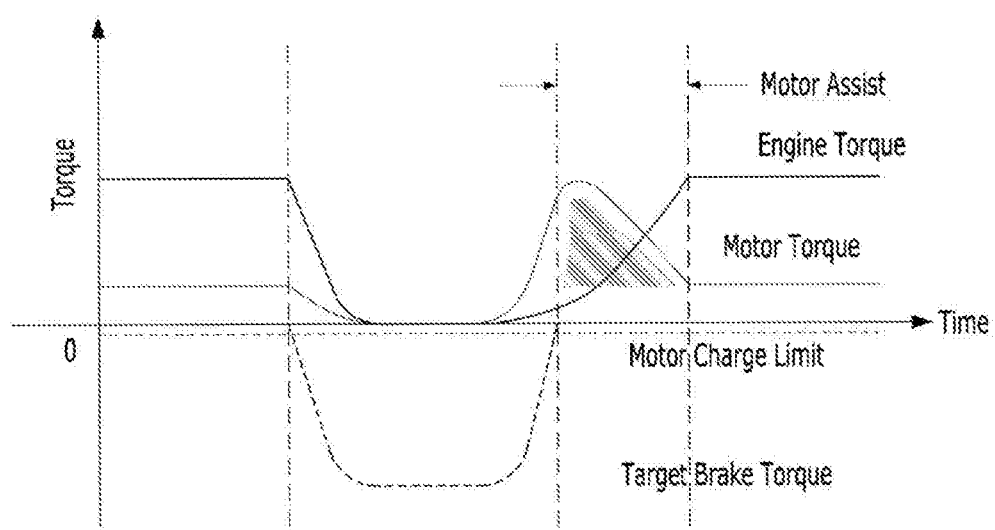

FIG. 9 is a flowchart showing an example of a procedure of determining a deceleration mode according to an exemplary embodiment of the present disclosure. FIGS. 10A to 10C show torque control forms of a deceleration mode according to an exemplary embodiment of the present disclosure.

First, the deceleration mode determination operation S750 of FIG. 7 may be configured as shown in FIG. 9. Referring to FIG. 9, when a motor brake torque available amount is greater than a value obtained by adding a predetermined margin to a total brake amount (i.e., brake amount requirement) (YES of S751), the deceleration mode may be determined as the first mode in which a total brake amount is borne by a motor only (S752). For example, as shown in FIG. 10A, when an APS value is maintained, an operating point of an engine may be maintained, target brake torque corresponding to a brake amount based on a BPS value may be embodied by regenerative brake torque of a motor.

On the other hand, when the value obtained by adding the predetermined margin to the total brake amount is equal to or greater than the motor brake torque available amount (NO of S751), or is smaller than a value obtained by adding a rapid reduction amount of engine torque to the motor brake torque available amount (YES of S753), the deceleration mode may be determined as the second mode in which motor brake torque and a rapid reduction amount of engine torque are used (S754). In this case, rapid reduction of engine torque may be embodied via delay of an ignition angle. For example, as shown in FIG. 10B, when a motor brake torque available amount is difficult to satisfy target brake torque due to motor charge limit, insufficient brake torque may be satisfied by engine torque reduction via delay of an ignition angle.

When a value obtained by adding a predetermined margin to a total brake amount is equal to or greater than a value obtained by adding rapid reduction amount of engine torque to a motor brake torque available amount, the hybrid controller 240 may check a motor discharge available amount and a SOC of a battery (S755). As the check result, when the motor discharge available amount is greater than a preset third reference value (i.e., a motor discharge available amount>Th3), and a SOC is greater than a preset fourth reference value (i.e., SOC>Th4), engine torque may be reduced via reduction in intake/fuel level to bear a brake amount and, a third mode using motor assist during coming re-acceleration may be determined as a deceleration mode (S756). Here, the reference values Th3 and Th4 may be determined as values, which are moderate for use of an electric motor during re-acceleration, depending on output of an electric motor and battery capacity. For example, as shown in FIG. 10C, when a motor brake torque available amount is difficult to satisfy target brake torque due to motor charge limit, insufficient brake torque may be satisfied by engine torque reduction. In this case, in an engine torque reduction method via reduction in intake/fuel level or injection off, a reduced torque amount may be high but response speed may be low compared with an ignition angle delay method. Accordingly, a speed at which engine torque is restored during re-acceleration is low, but when an electric motor outputs torque required for re-acceleration using a high response speed of the electric motor, overall acceleration response may be satisfied.

When a motor is not smoothly re-accelerated (NO of S755), the deceleration mode may be determined as a fourth mode in which a brake amount is borne by hydraulic brake (S757).

According to the aforementioned exemplary embodiments of the present disclosure, appropriate sports deceleration control may be selected depending on motor, battery, and engine states and, thus, fading or vapor lock due to brake overheating may be prevented to maintain the highest braking capability and, as regenerative brake via an electric motor occurs, a battery begins to be charged during deceleration, thereby ensuring motor assist capability during re-acceleration. In addition, inefficiency that is caused when fuel energy is converted into heat and is wasted due to friction of a brake during hydraulic brake may be reduced.

It is noted that the aforementioned exemplary embodiments are not a simple combination of acceleration control and regenerative brake of a general hybrid vehicle. In detail, in a general hybrid vehicle including an engine and an electric motor, acceleration traction force may be determined as the sum of torque of an engine and an electric motor and, basically, an optimum operating point of the engine may be a reference. That is, when higher torque than torque output at an optimum operating point of the engine is requested, the electric motor may be controlled to assist output, and when lower torque than torque output at the optimum operating point is requested, the motor may be controlled to generate electricity. When determining a brake amount depending BPS of a driver in terms of brake, the general hybrid vehicle may determine a regenerative brake amount depending on states of the motor and battery and may bear an insufficient brake amount by hydraulic brake.

As a result, in the general hybrid vehicle, a motor/battery system is commonly used for acceleration and deceleration control and, thus, it may be structurally impossible to simply combine and to simultaneously use conventional control methods with two purposes without changes. That is, in the general hybrid vehicle, even if APS and BPS values are simply summed to determine last output torque in a state in which a brake override function is released, when such output torque corresponds to acceleration, general acceleration control based on optimum efficiency may be accordingly performed, and when the output torque corresponds to deceleration, only general deceleration control may be accordingly performed, but the general hybrid vehicle may not be capable of being operated to reduce a burden of a hydraulic brake system while ensuring rapid re-acceleration unlike in the present disclosure.

Accordingly, it is noted that the present disclosure creatively proposes a distribution strategy of an engine and a motor in a sports deceleration situation of a general hybrid vehicle as well as substitution of only brake force with regenerative brake in the same situation.

The hybrid vehicle configured as described above and related to at least one embodiment of the present disclosure may differentiate a brake method depending on a vehicle situation while being decelerated using a specific method and, thus, efficiency may be enhanced and a brake system may be protected.

It will be appreciated by persons skilled in the art that that the effects that could be achieved with the present disclosure are not limited to what has been particularly described hereinabove and other advantages of the present disclosure will be more clearly understood from the detailed description.

The aforementioned present disclosure can also be embodied as computer readable code stored on a computer readable recording medium. The computer readable recording medium is any data storage device that can store data which can thereafter be read by a computer. Examples of the computer readable recording medium include a hard disk drive (HDD), a solid state drive (SSD), a silicon disc drive (SDD), read-only memory (ROM), random-access memory (RAM), CD-ROM, magnetic tapes, floppy disks, optical data storage devices, etc.

It will be apparent to those skilled in the art that various modifications and variations can be made in the present disclosure without departing from the spirit or scope of the inventions. Thus, it is intended that the present disclosure cover the modifications and variations of this invention provided they come within the scope of the appended claims and their equivalents.

What is claimed is:

1. A driving control method for a hybrid vehicle including an electric motor and an engine, the method comprising:
   when an acceleration request via manipulation of an accelerating pedal and a deceleration request via manipulation of a brake pedal are simultaneously made in a situation in which a predetermined condition for a function of limiting traction force and a brake override function is satisfied,
   implementing the acceleration request as torque of the engine; and
   implementing the deceleration request as regenerative brake torque of the electric motor while the acceleration request and the deceleration request are simultaneously made,
   wherein the predetermined condition is satisfied when the function of limiting traction force is released and the brake override function is released.

2. The method of claim 1, further comprising:
   when the regenerative brake torque does not satisfy an entire deceleration request, satisfying an insufficient brake amount by delay of an ignition angle of the engine or satisfying the insufficient brake amount via hydraulic brake.

3. The method of claim 1, further comprising:
   when a charging state condition of a battery for driving the electric motor is satisfied, satisfying the deceleration request by reducing torque of the engine via control of an injection amount; and
   compensating for an acceleration request amount with torque of the electric motor during re-acceleration.

4. A non-transitory computer readable recording medium having software instructions recorded thereon, wherein execution of the software instructions in the non-transitory computer readable recording medium causes a processor to:
   when an acceleration request via manipulation of an accelerating pedal and a deceleration request via manipulation of a brake pedal are simultaneously made in a situation in which a predetermined condition for a function of limiting traction force and a brake override function is satisfied,
   implement the acceleration request as torque of the engine; and
   implement the deceleration request as regenerative brake torque of the electric motor while the acceleration request and the deceleration request are simultaneously made,
   wherein the predetermined condition is satisfied when the function of limiting traction force is released and the brake override function is released.

5. A hybrid vehicle comprising:
   a motor;
   an engine; and
   a hybrid controller configured to, when an acceleration request via manipulation of an accelerating pedal and a deceleration request via manipulation of a brake pedal are simultaneously made in a situation in which a predetermined condition for a function of limiting traction force and a brake override function is satisfied, implement the acceleration request as torque of the engine and to implement the deceleration request as regenerative brake torque of the electric motor while the acceleration request and the deceleration request are simultaneously made,
   wherein the predetermined condition is satisfied when the function of limiting traction force is released and the brake override function is released.

6. The hybrid vehicle of claim 5, wherein, when the regenerative brake torque does not satisfy the entire deceleration request, the hybrid controller performs control to satisfy an insufficient brake amount by delay of an ignition angle of the engine.

7. The hybrid vehicle of claim 5, wherein, when a charging state condition of a battery for driving the electric motor is satisfied, the hybrid controller performs control to satisfy the deceleration request by reducing torque of the engine via control of an injection amount and to compensate for an acceleration request amount with torque of the electric motor during re-acceleration.

* * * * *